US011832112B2

(12) United States Patent
Omiya et al.

(10) Patent No.: US 11,832,112 B2
(45) Date of Patent: Nov. 28, 2023

(54) WIRELESS BASE STATION INSTALLATION POSITION CALCULATION METHOD AND WIRELESS BASE STATION INSTALLATION POSITION CALCULATION DEVICE (71) Applicant: NIPPON TELEGRAPH AND TELEPHONE CORPORATION, Tokyo (JP)

(72) Inventors: Riku Omiya, Musashino (JP); Toshiro Nakahira, Musashino (JP); Hirantha Abeysekera, Musashino (JP); Shoko Shinohara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 189 days.

(21) Appl. No.: 17/435,488
(22) PCT Filed: Feb. 25, 2020
(86) PCT No.: PCT/JP2020/007474
§ 371 (c)(1),
(2) Date: Sep. 1, 2021
(87) PCT Pub. No.: WO2020/179544
PCT Pub. Date: Sep. 10, 2020

(65) Prior Publication Data
US 2022/0141672 A1 May 5, 2022

(30) Foreign Application Priority Data
Mar. 4, 2019 (JP) ................ 2019-039033

(51) Int. Cl.
*H04W 16/18* (2009.01)
*H04W 16/24* (2009.01)
(52) U.S. Cl.
CPC ........... *H04W 16/18* (2013.01); *H04W 16/24* (2013.01)
(58) Field of Classification Search
CPC ....... H04W 16/18; H04W 16/24; Y02D 30/70
See application file for complete search history.

(56) References Cited

U.S. PATENT DOCUMENTS 6,553,233 B1 * 4/2003 Lee ...................... H04W 16/18
455/446

FOREIGN PATENT DOCUMENTS

JP 2012253496 A * 12/2012
JP 2017225119 A * 12/2017

OTHER PUBLICATIONS

S. Zirazi, P. Canalda, H. Mabed and F. Spies, "Wi-Fi access point placement within stand-alone, hybrid and combined wireless positioning systems," 2012 Fourth International Conference on Communications and Electronics (ICCE), Hue, Vietnam, 2012, pp. 279-284, doi: 10.1109/CCE.2012.6315912. (Year: 2012).*

(Continued)

*Primary Examiner* — Yuwen Pan
*Assistant Examiner* — Swati Jain
(74) *Attorney, Agent, or Firm* — Harness, Dickey & Pierce, P.L.C.

(57) ABSTRACT

A wireless base station setting position calculation method includes a step S1 for assuming the setting area to be a rectangle, receiving an input of longitudinal and lateral lengths of a setting area and the number of wireless base stations to be set "s", and determining one or more candidates of a number of divisions "d" of the setting area according to the number of wireless base stations "s", a step S2 for representing the number of divisions "d" in a division ratio x:y and selecting, for each number of divisions "d", according to the longitudinal and lateral lengths of the setting area, a division ratio at which diagonal line lengths of divided areas are minimized, a step S3 for performing, for each number of divisions "d", adjustment of a division pattern until a difference m between the number of divisions "d" and the number of wireless base stations "s" decreases to 0, a step S4 for calculating, for each number of divisions "d", a sum of the diagonal line lengths of the divided areas (Continued)

and selecting the division pattern with which the sum is minimized, and a step S5 for setting the wireless base stations in the centers of gravity of the divided areas in the division pattern selected in step S4.

2 Claims, 5 Drawing Sheets

(56) References Cited

OTHER PUBLICATIONS

R. Bose, "Computational complexity of optimal determination of cell sites and base station locations," 1999 IEEE International Conference on Personal Wireless Communications (Cat. No.99TH8366), Jaipur, India, 1999, pp. 462-466, doi: 10.1109/ICPWC.1999.759687. (Year: 1999).*
R. Rose, "A smart technique for determining base-station locations in an urban environment," in IEEE Transactions on Vehicular Technology, vol. 50, No. 1, pp. 43-47, Jan. 2001, doi: 10.1109/25.917869. (Year: 2001).*
IEEE Std 802.11-2016, Dec. 2016.
Takuto ARAI et al., "AMAP: Adaptive Movable Access Point System for Offloading Efficiency Enhancement", *IEICE*, RCS2016-43, pp. 107-112, May 2016.
J. Macqueen, "Some Methods for Classification and Analysis of Multivariate Observations", Proc. of 5th Berkeley Symposium on Mathematical Statistics and Probability, pp. 281-297, 1967.
International Search Report Issued in PCT/JP2020/007474, dated Jun. 2, 2020.

* cited by examiner

DIVISION INTO x
(DIVISION INTO THREE)

DIVISION INTO y
(DIVISION INTO FOUR)

WIRELESS BASE STATION INSTALLATION POSITION CALCULATION METHOD AND WIRELESS BASE STATION INSTALLATION POSITION CALCULATION DEVICE

CROSS-REFERENCE TO RELATED APPLICATIONS

This application is a 371 U.S. National Phase of International Application No. PCT/JP2020/007474 filed on Feb. 25, 2020 which claims priority to Japanese Application No. 2019-039033 filed on Mar. 4, 2019. The entire disclosures of the above applications are incorporated herein by reference.

TECHNICAL FIELD

The present invention relates to a wireless base station setting position calculation method and a wireless base station setting position calculation device for calculating setting positions of wireless base stations.

BACKGROUND ART

In recent years, according to the rapid spread of wireless terminals such as smartphones and tablet terminals, users using large-capacity contents by the wireless terminals have been increasing and a traffic amount on a wireless network has been sharply increasing. In order to easily store wireless traffic at low cost, the IEEE802.11 wireless LAN standard (Patent Literature 1) widely spread as a high-speed wireless access system using a radio wave in a wireless system license-free band is often used. Wireless LAN networks are provided in various areas including private areas such as homes and offices and public areas such as stores, stations, and airports.

The wireless LAN networks need to be constructed considering various elements such as a wireless LAN communication portion such as construction of wireless base stations and parameter setting, a network portion such as a portion between the wireless base stations and switches and a portion between the switches and back hole lines, and a high-order service portion such as user authentication and portal screens. Among those elements, in the present invention, setting positions of the wireless base stations in the construction of the wireless base stations are focused.

In general, in wireless communication, when a wireless signal is attenuated by a propagation distance or a shield, deterioration in quality and a capacity of the wireless communication occurs. Therefore, a state in which the distances between wireless base stations and wireless terminal stations are short and sight of propagation paths can be secured is desirable. On the other hand, the number of set wireless base stations is restricted by apparatuses, cost for setting and operation, wireless radio wave interference, and the like. Therefore, it is important to set a necessary number of wireless base stations in appropriate places with respect to an area covered by a wireless LAN.

As a wireless base station setting position calculation method, for example, Non-Patent Literature 2 proposes a technique for dynamically changing the positions of base station devices according to fluctuation in a user distribution in the area. It has been studied to house terminal devices in base station devices using a clustering method called k-means method described in Non-Patent Literature 3. Consequently, it is possible to calculate wireless base station setting positions according to user positions in the area.

CITATION LIST

Non Patent Literature

Non-Patent Literature 1: IEEE Std 802.11-2016, December 2016

Non-Patent Literature 2: Takuto Arai, Daisuke Goto, Masashi Iwabuchi, Tatsuhiko Iwakuni, Kazuki Maruta, "Proposal of an Adaptive Movable AP System for Realizing Offload Efficiency Improvement" IEICE technical report, RCS2016-43, pp. 107-112, May, 2016.

Non-Patent Literature 3: J. Macqueen, "SOME METHODS FOR CLASSIFICATION AND ANALYSIS OF MULTIVARIATE OBSERVATIONS", Proc. of 5th Berkeley Symposium on Mathematical Statistics and Probability, pp. 281-297, 1967.

SUMMARY OF THE INVENTION

Technical Problem

When wireless base stations are set in a state in which user positions are undecided, it is requested to equally and statically set the wireless base stations in a setting area. However, in Non-Patent Literature 2, it is assumed that all wireless base stations dynamically change positions according to the positions of users and it is not assumed to equally and statically set a predetermined number of wireless base stations in the setting area. It is also assumed that the number of wireless base stations to be set is given in advance. Thus, a method of calculating the number of wireless base stations is also necessary.

Note that, as a general method of calculating setting positions of wireless base stations, there is also known a method of manually writing circles on a drawing of a setting area with compasses to decide cover areas of the wireless base stations and setting the wireless base stations in the centers of the areas. However, this method is inefficient because manpower is used. Therefore, the setting positions of the wireless base stations cannot be automatically calculated.

An object of the present invention is to provide a wireless base station setting position calculation method and a wireless base station setting position calculation system that can automatically calculate setting positions for equally and statically setting a predetermined number of wireless base stations in a setting area with simple calculation.

Means for Solving the Problem

A first invention is a wireless base station setting position calculation method for calculating setting positions for setting a predetermined number of wireless base stations in a setting area, the wireless base station setting position calculation method including: a step S1 for assuming the setting area to be a rectangle, receiving an input of longitudinal and lateral lengths of the setting area and a number of wireless base stations to be set "s", and determining one or more candidates of a number of divisions "d" of the setting area according to the number of wireless base stations "s"; a step S2 for representing the number of divisions "d" in a division ratio x:y and selecting, for each number of divisions "d", according to the longitudinal and lateral lengths of the setting area, a division ratio at which diagonal line lengths of divided areas are minimized; a step S3 for performing, for each number of divisions "d", adjustment of a division pattern until a difference "m" between the number of divisions "d" and the number of wireless base stations "s" decreases to 0; a step S4 for calculating, for each number of divisions "d", a sum of the diagonal line lengths of the divided areas and selecting the division pattern with which the sum is minimized; and a step S5 for setting the wireless base stations in centers of gravity of the divided areas in the division pattern selected in step S4.

In the wireless base station setting position calculation method of the first invention, step S3 performs processing for equally dividing, among the divided areas having aspect ratios close to 1:1 among x divided areas on a side of a short side of the setting area and closest to a center of gravity of the setting area, y divided areas on a side of a long side into y+1 or y−1, repeating the division until the difference m decreases to 0, and finally equalizing the number of divisions d to the number of APs "s".

A second invention is a wireless base station setting position calculation device that calculates setting positions for setting a predetermined number of wireless base stations in a setting area, the wireless base station setting position calculation device including: first processing means for assuming the setting area to be a rectangle, receiving an input of longitudinal and lateral lengths of the setting area and a number of wireless base stations to be set "s", and determining one or more candidates of a number of divisions "d" of the setting area according to the number of wireless base stations "s"; second processing means for representing the number of divisions "d" in a division ratio x:y and selecting, for each number of divisions "d", according to the longitudinal and lateral lengths of the setting area, a division ratio at which diagonal line lengths of divided areas are minimized; third processing means for performing, for each number of divisions "d", adjustment of a division pattern until a difference "m" between the number of divisions "d" and the number of wireless base stations "s" decreases to 0; fourth processing means for calculating, for each number of divisions "d", a sum of the diagonal line lengths of the divided areas and selecting the division pattern with which the sum is minimized; and fifth processing means for setting the wireless base stations in centers of gravity of the divided areas in the division pattern selected by said fourth processing means.

In the wireless base station setting position calculation device of the second invention, the third processing means is configured to perform processing for equally dividing, among the divided areas having aspect ratios close to 1:1 among x divided areas on a side of a short side of the setting area and closest to a center of gravity of the setting area, y divided areas on a side of a long side into y+1 or y−1, repeating the division until the difference "m" decreases to 0, and finally equalizing the number of divisions "d" to the number of APs "s".

Effects of the Invention

According to the present invention, it is possible to automatically calculate setting positions for equally and statically setting a predetermined number of wireless base stations in a setting area with simple calculation.

DESCRIPTION OF EMBODIMENTS

A characteristic of the present invention is a procedure for giving, to information about, for example, the number of wireless terminals uniformly stored in a setting area of wireless base stations (APs), the number of APs to be set in the setting area and calculating setting positions for uniformly setting the APs in the setting area. At this time, the APs in the setting area are set such that radio wave strength in the setting area is substantially equal.

Figure 1:
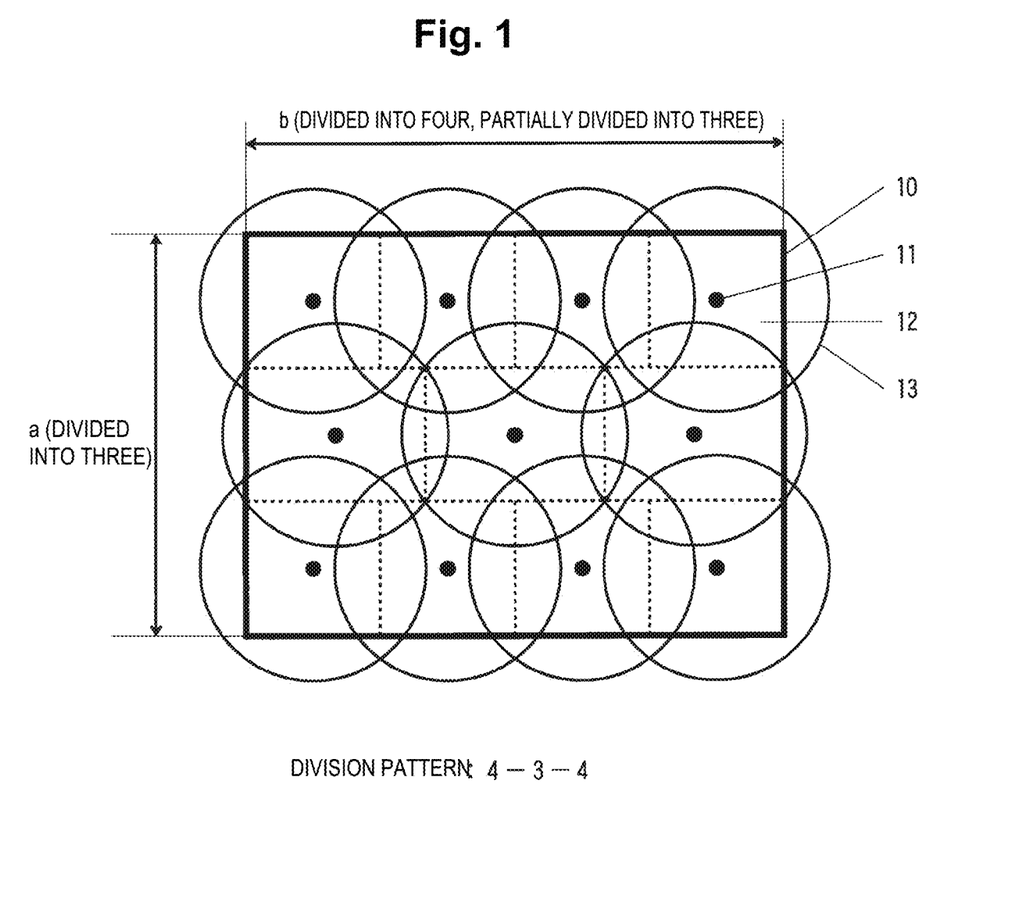
FIG. 1 is a diagram showing a setting example of wireless base stations (APs) according to the present invention.

FIG. 1 shows a setting example of the wireless base stations (APs) according to the present invention. In FIG. 1, an example is shown in which elven APs 11 are set in a rectangular setting area 10 having a short side "a" and a long side "b". The setting area 10 is divided into eleven divided areas 12. The APs 11 are arranged in the centers of gravity of the divided areas 12. Cover areas 13 of the APs 11 are represented by circles. The cover areas 13 cover the divided areas 12. The entire setting area 10 is covered by the cover areas 13 of the eleven APS 11.

Figure 2:
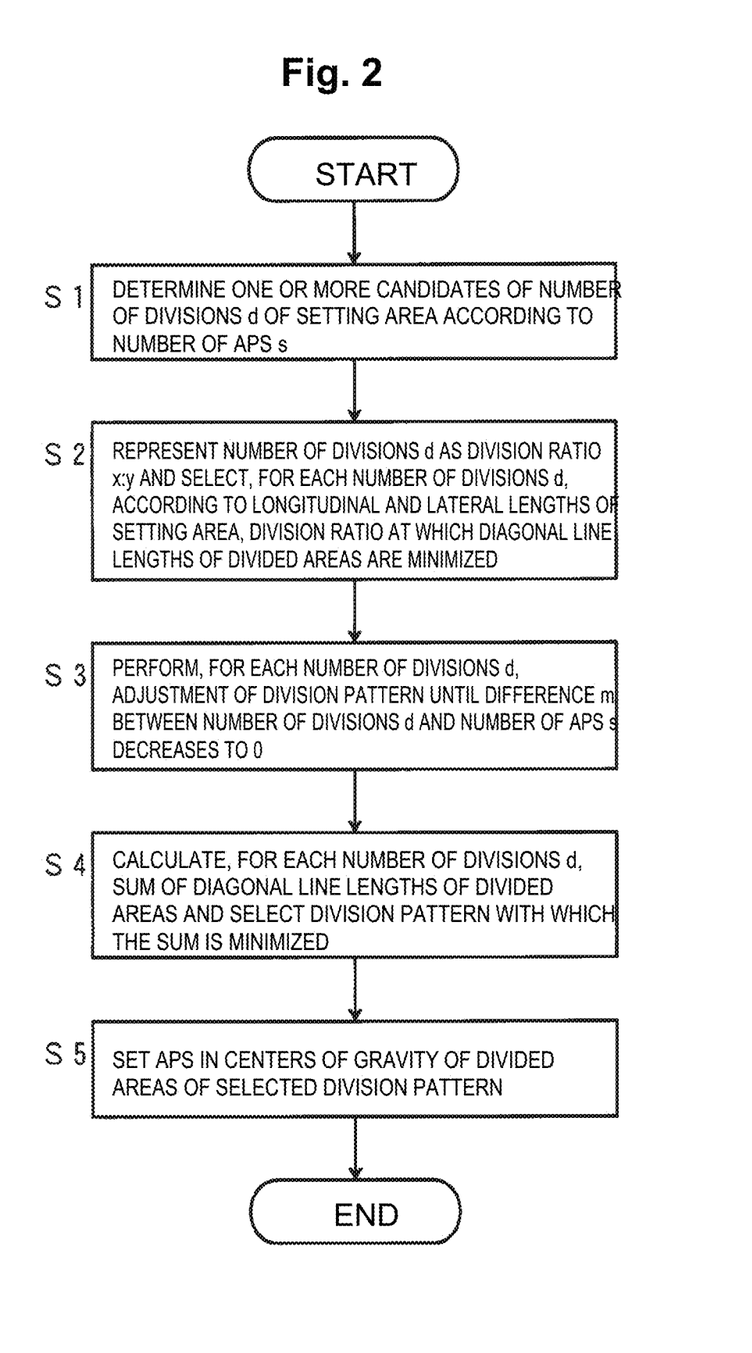
FIG. 2 is a flowchart showing a calculation procedure for setting positions of the wireless base stations (APs) according to the present invention.

FIG. 2 shows a calculation procedure for setting positions of the wireless base stations (APs) according to the present invention. In FIG. 2, steps S1 to S5 are executed.

(Step S1)

Processing in step S1 determines one or more candidates of the number of divisions "d" of the setting area according to a given number of APs "s". This is to advance the following processing while assuming that the number of divisions "d" includs numbers before and after the number of APs "s" under a situation in which division patterns of the setting area are limited if the number of APs "s" and the number of divisions "d" are set equal. For example, a minimum value of candidates of the number of divisions "d" is a maximum square number equal to or smaller than "s" and a maximum value of candidates of the number of divisions "d" is a minimum square number equal to or larger than "s".

That is, when the number of APs is eleven as in the example shown in FIG. 1, usually, there is only a division ratio of 1:11. However, by setting the numbers of candidates of the number of divisions "d" to nine to sixteen, it is possible to select an optimum division pattern from various division ratios and division patterns for each number of divisions "d". When the number of divisions "d" is represented by s+m, m is −2 to +5: m is a difference between the number of divisions "d" and the number of APs "s" and −2 indicates that the number of divisions "d" is smaller than the number of APs "s" by two. In this case, the divided areas are increased by two in later processing.

(Step S2)

Processing in step S2 represents the number of divisions "d" in a division ratio x:y (x≤y) and determines, for each number of divisions "d", a division ratio at which diagonal line lengths of the divided areas are minimized according to longitudinal and lateral lengths of the setting area. "The diagonal line lengths are minimized" indicates a state in which an aspect ratio of the divided areas is closest to 1:1 (an aspect ratio of a square). A division ratio x:y to the number of divisions d (9 to 16) corresponding to the number of APs 11 is as follows.

Number of divisions d=9 Division ratio 3:3, 1:9
d=10 Division ratio 2:5, 1:10
d=11 Division ratio 1:11
d=12 Division ratio 3:4, 2:6, 1:12
. . .
d=16 Division ratio 4:4, 2:8, 1:16

When the setting area is a rectangle having a short side "a" and a long side "b" (an aspect ratio a:b), x is the number of divisions on the side of the short side and y is the number of divisions on the side of the long side. For example, division ratios for the number of divisions d=12 are three ways described above. The division ratio at which the diagonal line lengths of the divided areas are minimized changes according to the aspect ratio a:b of the setting area. Accordingly, a division ratio at which the diagonal line lengths are minimized is determined for each number of divisions d (9 to 16) according to the aspect ratio a:b of the setting area.

Figure 3:
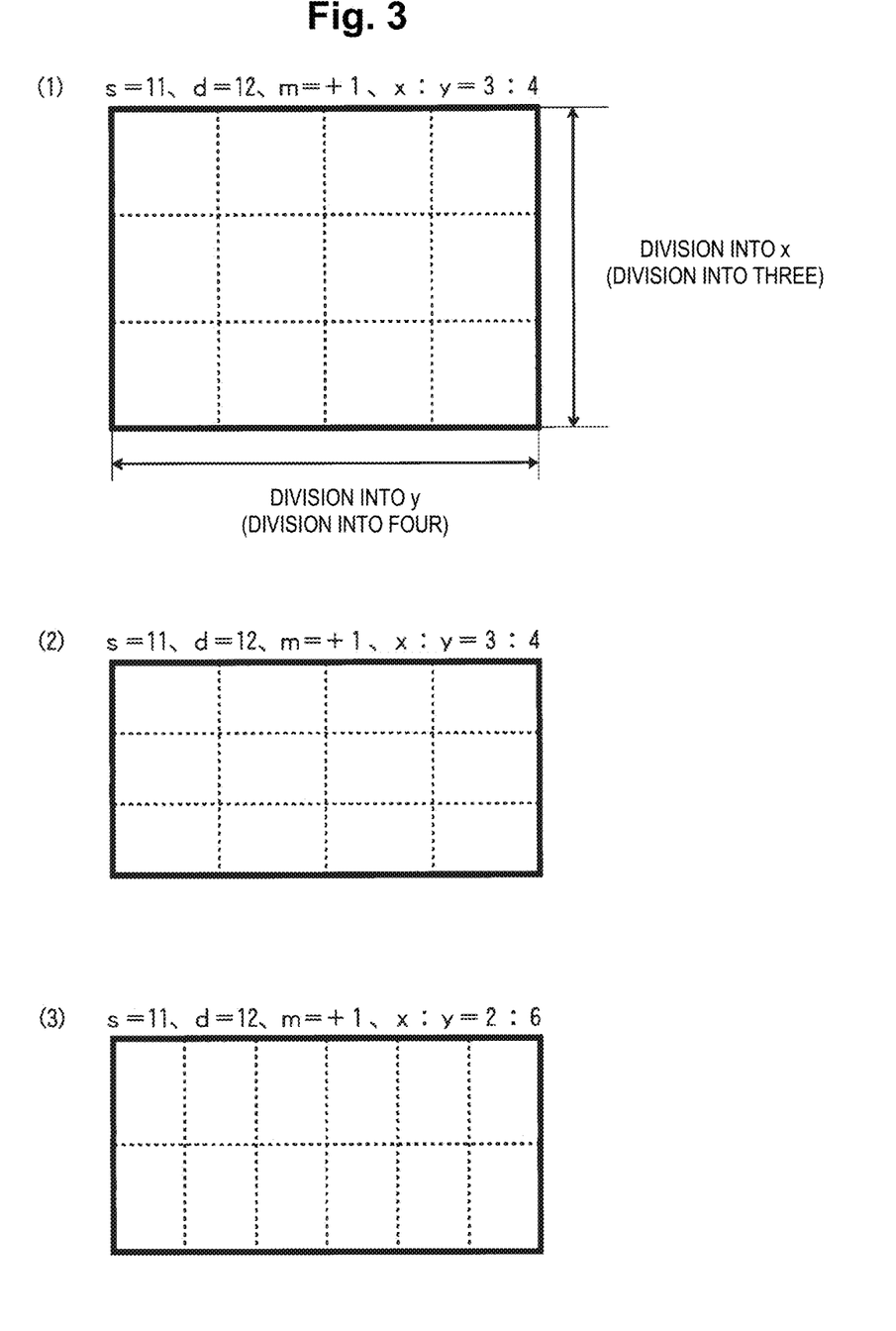
FIG. 3 is a diagram showing an example of a processing result of step S2.

An example of a calculation method for the division ratio is as described below. Since (diagonal line length)$^2$=(a/x)$^2$+ (b/y)$^2$, a division ratio x:y at which the right side is minimized is determined for each number of divisions d. For example, when the number of divisions "d" is twelve and the division ratios are 3:4, 2:6, and 1:12, if the aspect ratio of the setting area is 3:4, the divided areas are squares when the division ratio is 3:4 and the diagonal line lengths are minimized. This state is shown in FIG. 3 (1). If the aspect ratio of the setting area is 1:2, divided areas at the division ratio 3:4 are not square and the diagonal line lengths are minimum and equal at the division ratios 3:4 and 2:6. This state is shown in FIGS. 3 (2) and (3).

Note that, when the shape of the divided areas is a square, the cover areas (13 in FIG. 1) of the APs can be minimized. However, as explained below, it is assumed that the cover areas of the APs have margins such that, even if one divided area is expanded by adjusting the difference "m" between the number of divisions "d" and the number of APs "s", it is possible to cope with the expansion of the one divided area.

(step S3)

Processing in step S3 performs, for each number of divisions "d", adjustment of a division pattern until the difference "m" between the number of divisions "d" and the number of APs "s" decreases to 0. The adjustment of the division pattern refers to processing for equally dividing, among the divided areas having aspect ratios close to 1:1 among x divided areas on the side of the short side and closest to the center of gravity of the setting area, y divided areas on the side of the long side into y+1 or y−1, repeating the division until the difference m decreases to 0, and finally equalizing the number of divisions d to the number of APs "s". If the division ratio x:y is represented by a division pattern, the division ratio x:y is represented by y-y--y and x pieces of y.

Figure 4:
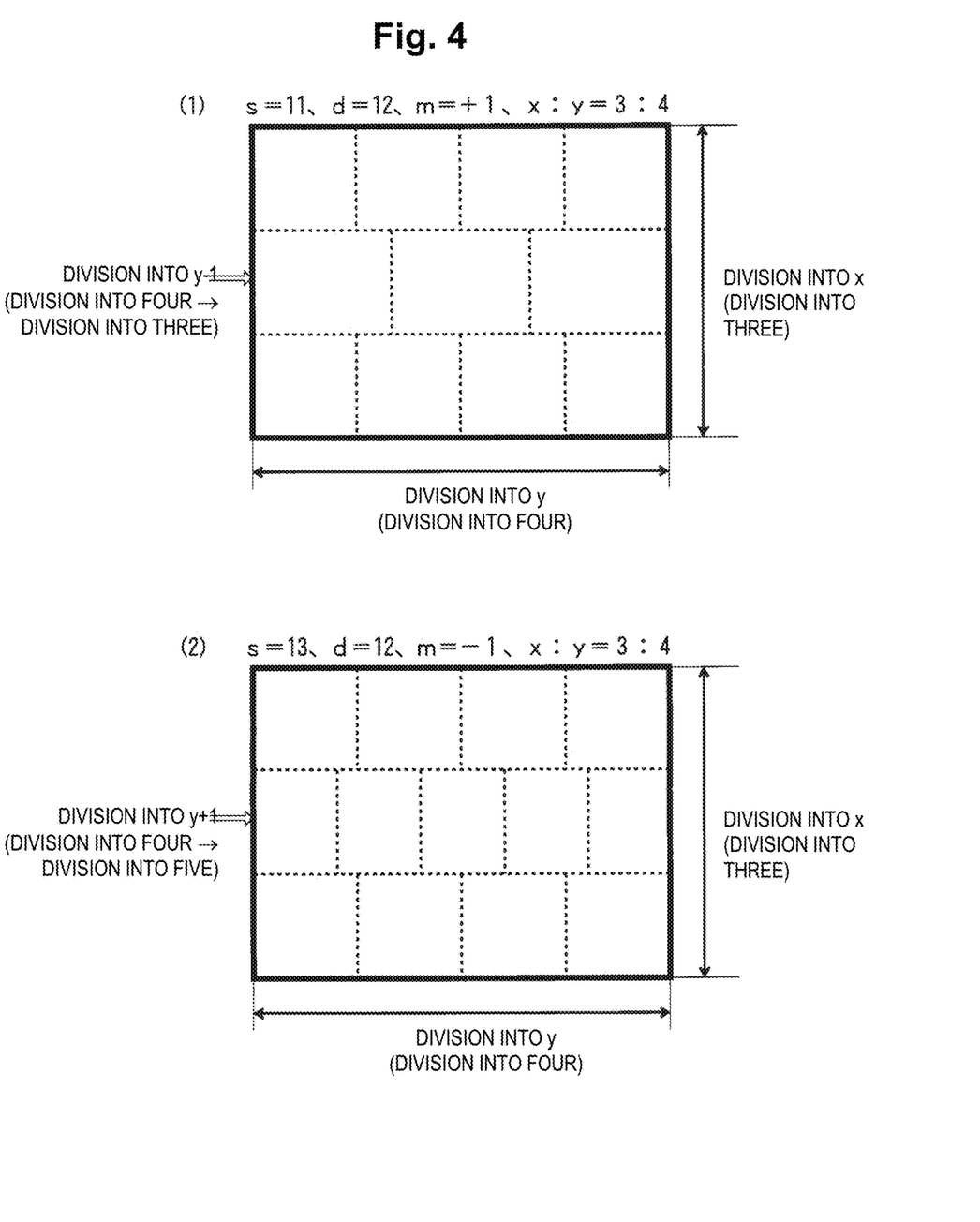
FIG. 4 is a diagram showing an example of a processing result of step S3.

For example, whereas the number of APs "s" is eleven, when the number of divisions d is twelve, m=+1, and the division ratio is 3:4 in the processing in step S2 (the state of FIG. 3 (1)), a second divided area on the side of the short side is equally divided into y−1 to reduce the divided areas by one according to the difference m=+1 between the number of divisions "d" and the number of APs "s". FIG. 4 (1) shows this state. The division pattern is 4-3-4. Whereas the number of APs "s" is thirteen, when the number of divisions "d" is twelve, m=−1, and the division ratio is 3:4 in the processing in step S2 (the state of FIG. 3 (1)), a second divided area on the side of the short side is equally divided into y+1 to increase the divided areas by one according to the difference m=−1 between the number of divisions "d" and the number of APs "s". FIG. 4 (2) shows this state. The division pattern is 4-5-4.

Note that, when m=±2 and it is necessary to increase or reduce the next divided area, a first or third divided area on the side of the short side having an aspect ratio close to 1:1 among the x divided areas on the side of the short side is equally divided into y±1.

According to the processing explained above, adjustment of a division pattern is performed, for each number of divisions d (9 to 16), according to the difference "m" between the number of divisions "d" and the number of APs "s".

(Step S4)

When the adjustments of the number of APs "s", the number of divisions "d", the difference "m", the division ratio x:y, and the divided areas are finished by the processing up to step S3, processing in step S4 calculates, for each number of divisions "d", a sum of diagonal line lengths of the divided areas and selects a division pattern with which the sum is minimized. A division pattern in which diagonal line lengths of the divided areas are minimum (each divided area is a square or close to the square) is selected for each number of divisions "d". When the number of divisions "d" becomes equal to the number of APs "s" through the adjustment of the divided areas in step S3, a division pattern with which the sum of the diagonal line lengths of the divided areas is minimized is set as an optimum division pattern.

For example, in FIGS. 3 (2) and (3), whereas the number of APs "s"=11, the number of divisions "d"=12, m=+1, and the division ratios are 3:4 and 2:6, when the diagonal line lengths of the divided areas are equal, the sum of the diagonal line lengths of the divided areas is also equal in this state. However, since the difference "m" between the number of divisions "d" and the number of APs "s" is +1, it is necessary to reduce the divided areas by one. The divided area is equally divided into y−1. At this time, the sum of the diagonal line lengths changes when the division into four in FIG. 3 (2) is changed to division into three and when the division into six in FIG. 3 (3) is changed to division into five. For example, the sum of the diagonal line lengths is smaller in the former. Accordingly, whereas the number of APs "s"=11, when the number of divisions "d"=12, the pattern 4-3-4 is selected rather than the division pattern 6-5. This processing is executed for each number of divisions "d" (9 to 16) to select a division pattern with which the sum of the diagonal line lengths of the divided areas is minimized.

(Step S5)

Finally, processing in step S5 sets the APs in the centers of gravity of the divided areas of the selected division pattern. Consequently, the "s" of APs can be uniformly geometrically arranged in the setting area having the size of a×b. This example is shown in FIG. 1.

Figure 5:
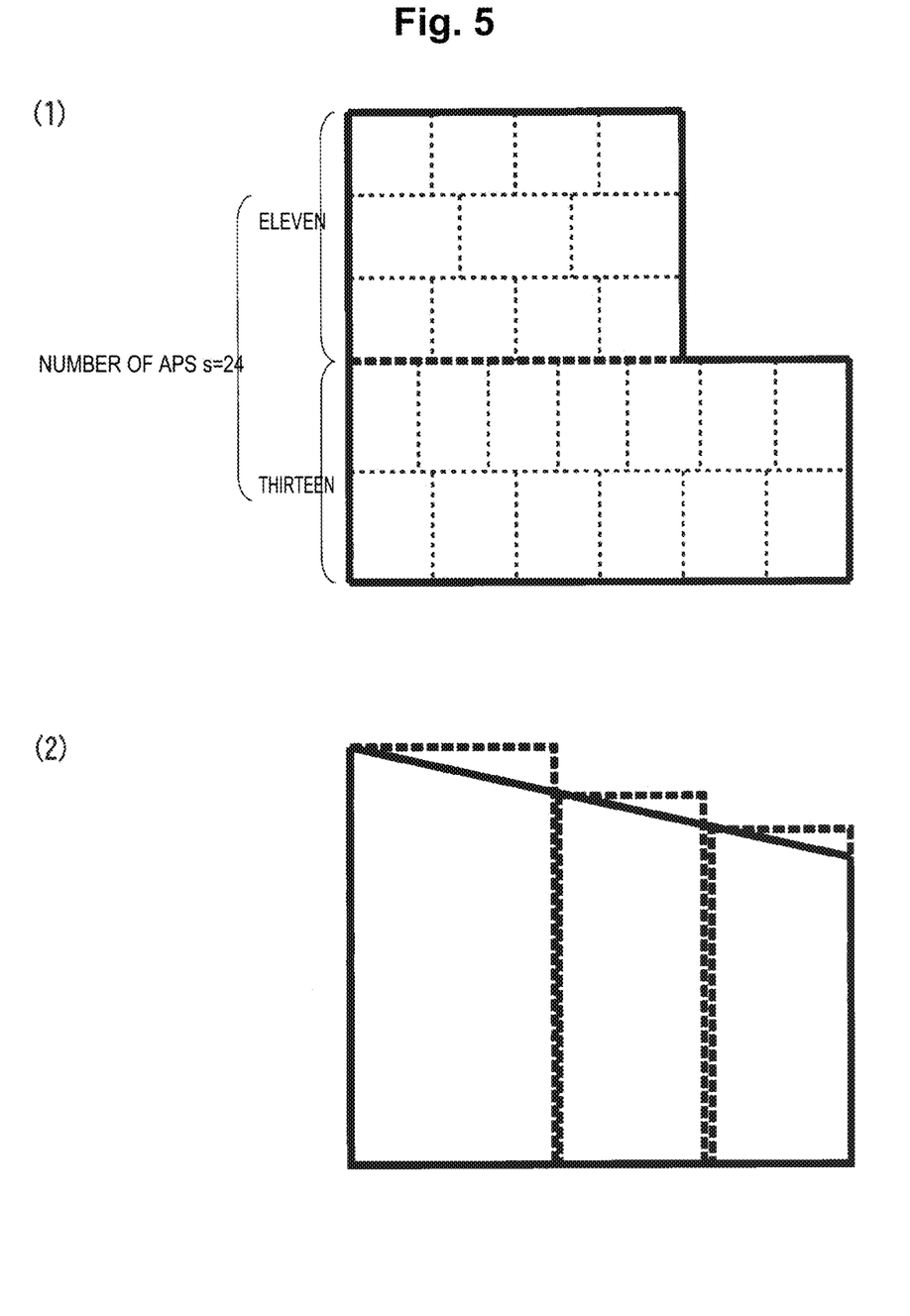
FIG. 5 is a diagram showing another setting example of the wireless base stations (APs) according to the present invention.

In the above explanation, the setting area is explained as the rectangle. However, the setting area is not limited to the rectangle. The present invention is also applicable when the setting area is other figures. For example, as shown in FIG. 5 (1), when the setting area can be divided into a combination of rectangles, the given number of APs "s" is divided according to an area ratio of the divided setting areas. The processing procedure shown in FIG. 2 is executed for each of the divided rectangular setting areas. As shown in FIG. 5 (2), in the case of setting areas including oblique lines or curved lines, the setting areas may be approximated to a plurality of rectangular setting areas and the processing procedure may be executed in the same manner.

When a setting area is a three-dimensional space, it is possible to easily cope with the setting area by changing one divided area from a rectangle to a rectangular parallelepiped and performing the processing procedure shown in FIG. 2 with a three-dimensional calculation.

When the number of APs necessary for the setting area is calculated, when the setting area is a rectangle for example, the number of APs is calculated as described below. A short side of the setting area is represented as "a" and a long side of the setting area is represented as "b". When a cover area of an AP is represented by a circle, the length of one side of an inscribing quadrangle of the circle is represented as 1. The number of divisions in the short side direction and the long side direction can be calculated by rounding up decimal points of a/1 and b/1. The number of divided areas multiplied by the number of divisions is the necessary number of APs. The APs are arranged in the center of gravity positions of the divided areas.

Consequently, it is possible to calculate, based on a cover area per one wireless base station, the number of wireless base stations that should be set in a setting area.

REFERENCE SIGNS LIST

10 Setting area
11 Wireless base station (AP)
12 Divided area
13 Cover area

The invention claimed is:

1. A wireless base station setting position calculation method for calculating setting positions for setting a predetermined number of wireless base stations in a setting area, the wireless base station setting position calculation method comprising:
 a step S1 for assuming the setting area to be a rectangle, receiving an input of longitudinal and lateral lengths of the setting area and a number of wireless base stations to be set "s", and determining one or more candidates of a number of divisions "d" of the setting area according to the number of wireless base stations "s";
 a step S2 for representing the number of divisions "d" in a division ratio x:y and selecting, for each number of divisions "d", according to the longitudinal and lateral lengths of the setting area, a division ratio at which diagonal line lengths of divided areas are minimized;
 a step S3 for performing, for each number of divisions "d", adjustment of a division pattern until a difference "m" between the number of divisions "d" and the number of wireless base stations "s" decreases to 0;
 a step S4 for calculating, for each number of divisions "d", a sum of the diagonal line lengths of the divided areas and selecting the division pattern with which the sum is minimized; and
 a step S5 for setting the wireless base stations in centers of gravity of the divided areas in the division pattern selected in step S4.

2. The wireless base station setting position calculation method according to claim 1, wherein step S3 performs processing for equally dividing, among the divided areas having aspect ratios close to 1:1 among x divided areas on a side of a short side of the setting area and closest to a center of gravity of the setting area, y divided areas on a side of a long side into y+1 or y−1, repeating the division until the difference m decreases to 0, and finally equalizing the number of divisions d to the number of APs "s".

* * * * *